United States Patent

O'Dowd et al.

[11] Patent Number: 5,857,440
[45] Date of Patent: Jan. 12, 1999

[54] ENGINE PISTON AND METHOD FOR ITS MANUFACTURE

[75] Inventors: Melvin G. O'Dowd, Rochester Hills; Jeffrey Demmers, New Baltimore; David Kulasa, Sterling Heights, all of Mich.

[73] Assignee: Melco Engraving, Inc., Rochester Hills, Mich.

[21] Appl. No.: 870,503

[22] Filed: Jun. 6, 1997

Related U.S. Application Data

[60] Provisional application No. 60/019,280, Jun. 7, 1996.

[51] Int. Cl.$^6$ ....................................................... F02F 3/00
[52] U.S. Cl. ........................................................ 123/193.6
[58] Field of Search ................................ 123/193.6, 669; 92/222, 223

[56] References Cited

U.S. PATENT DOCUMENTS

| | | | |
|---|---|---|---|
| 4,577,611 | 3/1986 | Hagino | 123/193.6 |
| 4,899,702 | 2/1990 | Sasaki et al. | 123/193.6 |
| 4,987,865 | 1/1991 | Schenkel | 123/193.6 |
| 5,314,717 | 5/1994 | Alt | 123/193.6 |

*Primary Examiner*—Marguerite McMahon
*Attorney, Agent, or Firm*—Gifford, Krass, Groh, Sprinkle, Patmore, Anderson & Citkowski, P.C.

[57] ABSTRACT

A piston for an internal combustion engine includes a textured, macroscopic, relief pattern on the inner and/or outer face of its skirt portion. The pattern improves heat transfer and oil flow, and decreases the weight of the piston, while maintaining or enhancing its strength. The pattern may be formed in the piston when it is molded, or it may be formed thereupon after molding by a chemical etch process.

12 Claims, 1 Drawing Sheet

ENGINE PISTON AND METHOD FOR ITS MANUFACTURE

RELATED APPLICATION

This patent application claims priority of provisional patent application Ser. No. 60/019,280 filed Jun. 7, 1996.

1. Field of the Invention

This invention relates generally to internal combustion engines. More specifically, the invention relates to pistons for internal combustion engines. Most specifically, the invention relates to a piston having a textured surface on the skirt thereof, and to methods for the manufacture of the piston.

2. Background of the Invention

In an internal combustion engine, the piston is the primary interface between the chemical reaction which constitutes the combustion process, and the remainder of the engine. It is the piston which most directly converts chemical energy to mechanical energy. Accordingly, the piston is subjected to high temperature conditions and high degrees of mechanical loading. Furthermore, it must undergo rapid, repetitive motion, while maintaining precise tolerances. In order to minimize the weight of moving parts in the engine, pistons are preferably made to be as light as possible, and as a consequence, pistons are often fabricated from alloys of aluminum and the like. Since these alloys are relatively low melting and relatively soft, temperature control and lubrication are critical.

A number of approaches have been implemented to manufacture pistons which are strong, light in weight, and which have a good rate of heat transfer. U.S. Pat. No. 4,776,075 discloses a piston having an oil passageway cast into the interior of the crown portion thereof. This passageway enhances the flow of oil through the piston, thereby providing cooling. Casting is accomplished through a salt core technique. This technique is labor intensive, and expensive, and while the piston structure does exhibit enhanced heat transfer, overall strength of the piston is compromised by the presence of the channel. In other approaches, pistons have been fabricated from composites of ceramics and metal so as to provide enhanced durability and light weight. These pistons are relatively expensive to fabricate and install.

There is a need for a piston which is light in weight, but strong, and which transfers heat efficiently. It is further desirable that any such piston be of simple construction and easy to manufacture. Typically, pistons are manufactured by a casting process, wherein molten metal is introduced into a mold cavity to produce a cast piston which is subsequently machined to final tolerances. It is further desirable that any process for manufacturing an improved piston be compatible with such a molding process, and it is further desirable that it does not require any additional machining steps.

As will be explained in greater detail hereinbelow, the present invention is directed to a piston having a particular textured pattern on various of the internal surfaces thereof. The pattern enhances heat transfer and oil flow and preserves the strength of the piston. Additionally, when the piston is fabricated by a molding process the presence of a pattern on the surface of the mold enhances the flow of molten metal, thereby increasing the efficiency of the molding process. These and other advantages of the present invention will be apparent from the drawings, discussion and description which follow.

BRIEF DESCRIPTION OF THE INVENTION

There is disclosed herein a piston for an internal combustion engine. The piston is configured as a hollow, generally cylindrical body, open at one end, and it includes a crown portion defining a top wall of the piston, and a skirt portion which defines the side wall of the piston. In accord with the present invention, the skirt portion includes a face which has a macroscopic, textured relief pattern defined thereupon. The pattern may cover all or part of the inner and/or outer face of the skirt, and may also cover all or a portion of the bottom face of the crown portion of the piston. In a preferred embodiment, the macroscopic relief pattern includes features having a depth in the range of 0.1–10 mm, while in certain embodiments, the depth of the relief pattern is specifically 0.5–5 mm. The width of the features of the relief pattern may be in the range of 0.5–20 mm, and in some particular embodiments the width of the relief pattern is in the range of 0.5–10 mm.

Also disclosed herein is a method for making a piston of the foregoing type. The method comprises molding the piston in a mold assembly, in which the mold cavity is textured so as to impress a relief pattern onto a surface of the skirt of a piston being formed therein. In another embodiment of the present invention, a piston is made by a conventional process, and subsequently has the macroscopic, textured relief pattern formed onto its skirt portion. In this embodiment, the macroscopic, textured relief pattern may be formed by applying a pattern of resist material to the inner and/or outer face of the skirt portion and chemically etching the piston.

DETAILED DESCRIPTION OF THE INVENTION

In accord with the present invention, it has been found that the performance of pistons, and of internal combustion engines which include such pistons, is greatly enhanced if the skirt of the piston is textured with a macroscopic, relief pattern. The presence of the macroscopic relief pattern increases the rate of heat transfer of the piston, and increases oil flow over the piston. In addition, the pattern decreases the weight of the piston while maintaining, or in some instances actually increasing, the strength of the piston. As will be explained in detail hereinbelow, the pistons of the present invention may be manufactured according to presently employed techniques. In those instances where the pistons are manufactured by a molding process, a textured pattern is provided on a surface of the mold, and it has been found that the presence of the macroscopic relief pattern actually enhances mold filling by promoting flow of molten metal through a mold.

The pattern of the present invention is described herein as being a macroscopic, relief pattern. Within the context of this disclosure, a relief pattern is defined as a three-dimensional pattern including raised portions. Within the context of this disclosure, a macroscopic pattern is a pattern having features discernable by the naked eye, and is specifically distinguished from a microscopic texture such as is provided by grains in a metallic matrix or surface roughness resultant from metal fabrication processes. Most typically, a macroscopic, textured, relief pattern in accord with the present invention comprises a pattern in which the features have a depth in the range of 0.1–10 mm and a width in the range of 0.5–20 mm.

Figure 1:
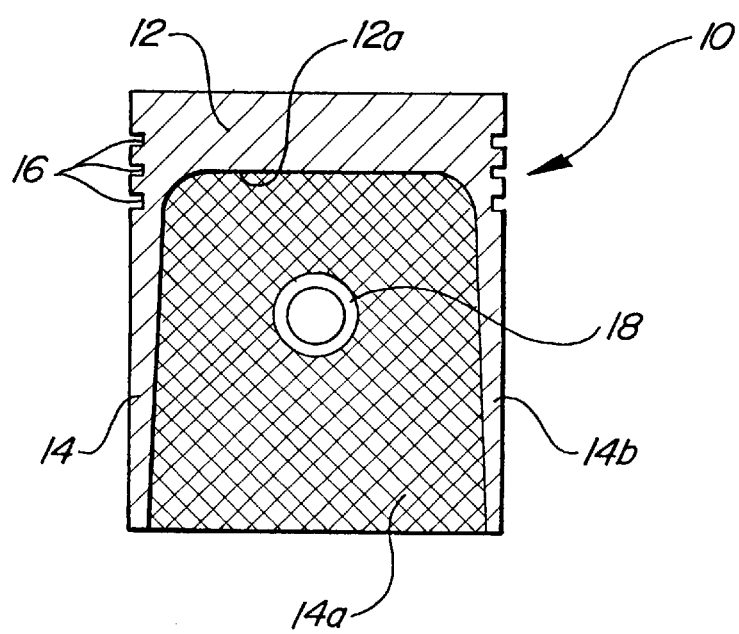
FIG. 1 is a cross-sectional view of a piston structured in accord with the principles of the present invention.

Referring now to FIG. 1, there is shown a cross-sectional view of a piston structured in accord with the principles of the present invention. The piston 10 of FIG. 1 is representative of conventional pistons of the type employed in internal combustion engines. The piston is configured as a hollow, generally cylindrical body which is open at one end. The piston includes a crown portion 12 which defines the top wall of the piston, and a skirt portion 14 which is generally disposed at right angles to the crown portion, and which defines a side wall of the piston. As is conventional in the art, the piston 10 includes a series of grooves 16, which are configured to receive piston rings therein. The piston 10 further includes a boss portion 18 formed therein which receives and supports a piston pin (not shown) which joins the piston 10 to a connecting rod which is in turn joined to a crankshaft of an engine (both not shown).

In accord with the present invention, a macroscopic, textured, relief pattern is provided upon the inner face 14a of the skirt portion 14 of the piston 10. As shown in FIG. 1, the relief pattern covers the entirety of the inner face 14a of the skirt portion 14; although, in some embodiments of the present invention, the pattern may be disposed only upon a portion of the inner face. In accord with the present invention the pattern may also (or alternatively) be formed on the outer face 14b of the skirt portion of the piston. Also, it is to be understood that the pattern may also be disposed upon the bottom face 12a of the crown portion 12 of the piston 10.

It has been found that the presence of the relief pattern facilitates the flow of oil across the inner face 14a and outer face 14b of the skirt portion 14 of the piston. It is believed that the texture in the pattern breaks up an oil film permitting better draining, and hence enhances contact between oil and the inner surface of the piston. The textured pattern also increases the surface area of the faces of the skirt portion 14 thereby increasing the area available for thermal transfer. Hence, a piston including the textured relief pattern is more efficient at transferring heat than is an untextured piston. The relief pattern also decreases the weight of the piston to some degree, and this decrease in weight will enhance the efficiency of the engine. Since the pistons of an engine are rapidly and repetitively moving, even relatively small decreases in weight translate into significant improvements in efficiency. In addition, lightening of the piston reduces impact and wear on bearings, journals and the like. As will be explained in detail hereinbelow, the macroscopic, relief pattern may be selected so that the overall strength of the piston is not decreased, and in some instances is even increased.

It has, surprisingly, been found that inclusion of the relief pattern confers yet another advantage in those instances where the pistons are formed by a casting process. Typically, pistons are cast by pouring molten metal into a mold cavity configured to correspond to the piston. It is important to fill a mold completely so as to avoid formation of bubbles or other voids which produce an unacceptable product, and it has been found that when a piston is being cast into a mold which includes textured features thereupon, corresponding to the macroscopic, texture relief pattern of the present invention, mold filling is facilitated. It is believed that the textured features on the mold itself serve to break up flow of molten metal thereby releasing bubbles and improving the casting process.

As was explained hereinabove, the macroscopic, textured, relief patterns of the present invention include those patterns having features which are generally discernable to the naked eye, and such features typically have a depth in the range of 0.1–10 mm, and a width in the range of 0.5–20 mm. In some particular embodiments of the present invention, the depth of the relief pattern falls in the range of 0.5–5 mm, and the width in the range of 0.5–10 mm. It is to be understood that larger features may be employed in some particular instances. The textured relief pattern may comprise a regular pattern or an irregular pattern. FIG. 1 shows a piston having a relief pattern comprising a series of crosshatched, diamond shaped members.

Figure 2:
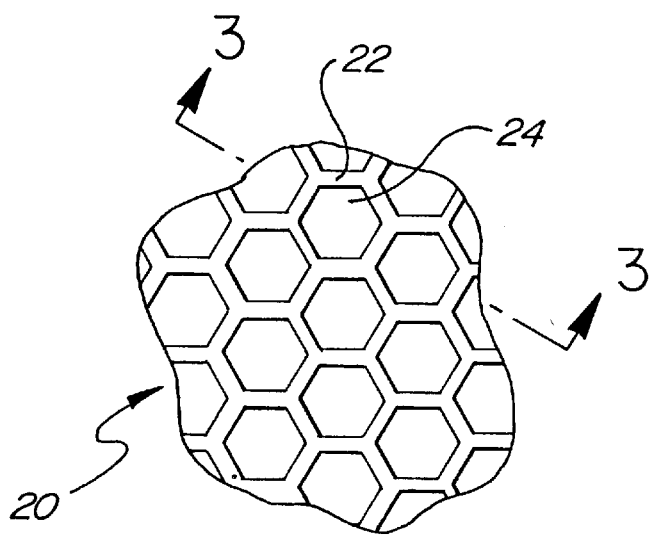
FIG. 2 is an enlarged, fragmentary, view of the inner face of a skirt portion of a piston structured in accord with the principles of the present invention, and illustrating a hexagonal relief pattern thereupon.
Figure 3:
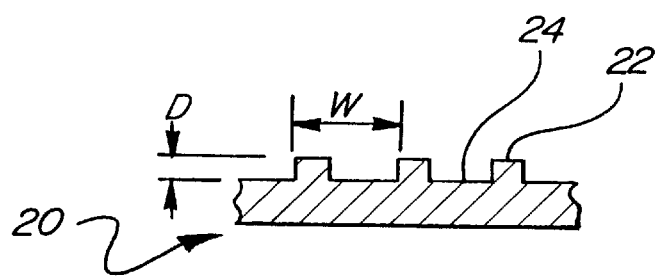
FIG. 3 is a cross-sectional view of the piston of FIG. 2 taken along lines 3—3.

Referring now to FIG. 2, there is shown an enlarged, fragmentary view of the a face 20 of the skirt portion of a piston. As can be seen, the textured pattern in the FIG. 2 embodiment comprises a series of hexagons, each bounded by a raised wall 22, and each including a center 24 recessed below the top surface of the wall 22. FIG. 3 depicts a cross-sectional view of the FIG. 2 embodiment taken along lines 3—3, and it will be noted from FIG. 3 that the central portion 24 of each of the hexagons constituting the macroscopic, relief pattern is recessed with regard to the wall portions 22 thereof. It is to be understood that the textured pattern may be otherwise configured. For example, the central portions 24 may be raised and the wall portions 22 recessed.

The hexagon pattern of FIG. 2 comprises one preferred embodiment of the relief pattern, insofar as it has been found that this pattern serves to maintain the strength and integrity of the side wall of the piston, while permitting sufficient removal of material therefrom to significantly lighten the piston. Other such configurations, such as triangular configurations, diamond shaped configurations, and the like may be similarly employed. As detailed above, the size range of the features will depend upon particular applications. In the illustrated embodiment of FIG. 2, the width dimension (W) is typically several millimeters, and the depth dimension (D) is generally somewhat less, namely a fractional millimeter to several millimeters.

Still other relief patterns may be employed in the practice of the present invention. For example, the pattern may be simply constituted by a series of pits or raised portions defined in the inner face of the side wall of the piston. Also, while the pattern is shown in FIG. 2 as being a regular, repeat pattern, it is to be understood that irregular patterns, including random patterns, may be similarly employed. For example, a reticulated pattern (similar to the graining on leather) may be employed in the practice of the present invention. Likewise, a grooved pattern may be similarly employed.

It is a noteworthy feature of the present invention that inclusion of a relatively simple to fabricate pattern greatly enhances piston performance. The pattern of the present invention may be formed in a number of ways. In most instances, pistons are fabricated by a molding process, wherein molten metal is injected into the cavity of a die and subsequently cooled to form a piston, which is typically subjected to machining or other metalworking steps to form the outer surfaces thereof. In a process of this type, a macroscopic, textured pattern may be readily formed on the skirt portion by appropriately texturing the mold cavity. There are a number of techniques known and available to those of skill in the art, whereby mold surfaces may be provided with a textured pattern. One process comprises a chemical etch procedure wherein a resist material, such as an asphalt or vinyl based material, is applied to the surface of a mold in an imagewise pattern, and the mold is subsequently etched in acid to form a pattern thereupon. Techniques of this type are utilized to texture molds for the production of items having a simulated leather grain appearance or other decorative textures on their surfaces, and such techniques are disclosed in U.S. Pat. Nos. 3,052,581 and 4,321,105, the disclosures of which are incorporated herein by reference.

In some instances, it may be desirable to implement the present invention in conjunction with pistons which have already been manufactured or with pistons which are manufactured by a process other than casting. In such instances, the aforedescribed masking techniques may be employed to chemically etch a pattern into an existing piston. For example, a pattern of resist material may be prepared by photolithographic techniques and subsequently transferred to a carrier such as tissue paper. This pattern is then applied to the interior surface of a piston, and the resist masked piston is then chemically etched to produce a preselected relief pattern thereupon. Etching materials and conditions will depend upon the particular metals being etched. Typically, molds or dies used for the fabrication of pistons are prepared from high hardness steels, and such steels are readily etched by acids such as nitric acid. One particularly preferred etchant comprises nitric acid diluted 5 to 1 with water. This etchant typically removes most mold grade steels at room temperature, at a rate of 1/1000 of an inch per 10 minutes. Aluminum alloys are preferably etched under somewhat milder conditions, and one particularly preferred etchant for aluminum alloys comprises a solution of ferric chloride in water. One specifically preferred etchant comprises a 50/50 mixture of a 38° baume ferric chloride solution in water, and this mixture etches aluminum alloys at a rate of approximately 1/1000 of an inch per minute at room temperature. As is known in the art, etching may be facilitated by stirring, air agitation or the like. Also, the present invention is not limited to any particular etching technique, but may be employed in conjunction with any technique known in the art.

In some instances, portions of the outer face of the skirt of the piston are provided with a series of grooves to enhance oil flow thereacross. Typically, these grooves are formed in the outer face of the skirt by grinding or milling, after the piston is complete. Through the use of the techniques of the present invention, grooves may be chemically etched into the outer face of the skirt of a completed piston, or may be formed during the molding of the piston, by appropriately texturing the mold.

Thus, it will be seen that the present invention enhances the performance of pistons for internal combustion engines, by providing a macroscopic, textured, relief pattern on the skirt portion thereof. This pattern improves heat transfer and oil flow. In addition, the pattern decreases the weight of the piston, while maintaining or enhancing its mechanical strength. Also, presence of the pattern in a mold improves the filling of the mold by eliminating air bubbles and other voids. The invention may be implemented by texturing the mold in which pistons are made, or by texturing the pistons after they are fabricated.

The foregoing drawings, discussion and description are illustrative of particular embodiments of the present invention, but are not meant to be limitations upon the practice thereof. It is the following claims, including all equivalents, which define the scope of the invention.

We claim:

1. A piston for an internal combustion engine, said piston being configured as a hollow, generally cylindrical body which is open at one end, said piston comprising:

a crown portion which defines the top wall of said piston; and a skirt portion which defines a side wall of said piston, said skirt portion having a macroscopic, textured, relief pattern defined upon at least a portion of an inner face thereof.

2. A piston as in claim 1, wherein said relief pattern covers at least a portion of an inner face of said first portion.

3. A piston as in claim 1, wherein said relief pattern covers substantially all of the inner face of said skirt portion.

4. A piston as in claim 1, wherein said relief pattern also covers at least a portion of an outer face of said skirt portion.

5. A piston as in claim 1, wherein said relief pattern includes features having a depth in the range of 0.1–10 mm.

6. A piston as in claim 1, wherein said relief pattern includes features having a depth in the range of 0.5–5 mm.

7. A piston as in claim 1, wherein said relief pattern includes features having a width in the range in the range of 0.5–20 mm.

8. A piston as in claim 1, wherein said relief pattern includes features having a width in the range of 0.5–10 mm.

9. A piston as in claim 1, wherein said relief pattern is a hexagonal pattern.

10. A piston as in claim 1, wherein said relief pattern is a random pattern.

11. A piston as in claim 1, fabricated from an aluminum alloy.

12. A piston for an internal combustion engine, said piston being configured as a hollow, generally cylindrical body which is open at one end, said piston comprising:

a crown portion which defines the top wall of said piston; and a skirt portion which defines a side wall of said piston, said skirt portion having a macroscopic, textured, relief pattern defined upon at least a portion of a face thereof;

said relief pattern also covering at least a portion of a bottom face of the crown portion.

* * * * *